March 7, 1967  C. E. ANDERSON  3,307,574
DRAIN STRUCTURE FOR VENTING LEAKED FLUID FROM
VALVE STEM PACKING
Filed Feb. 7, 1964  2 Sheets-Sheet 1
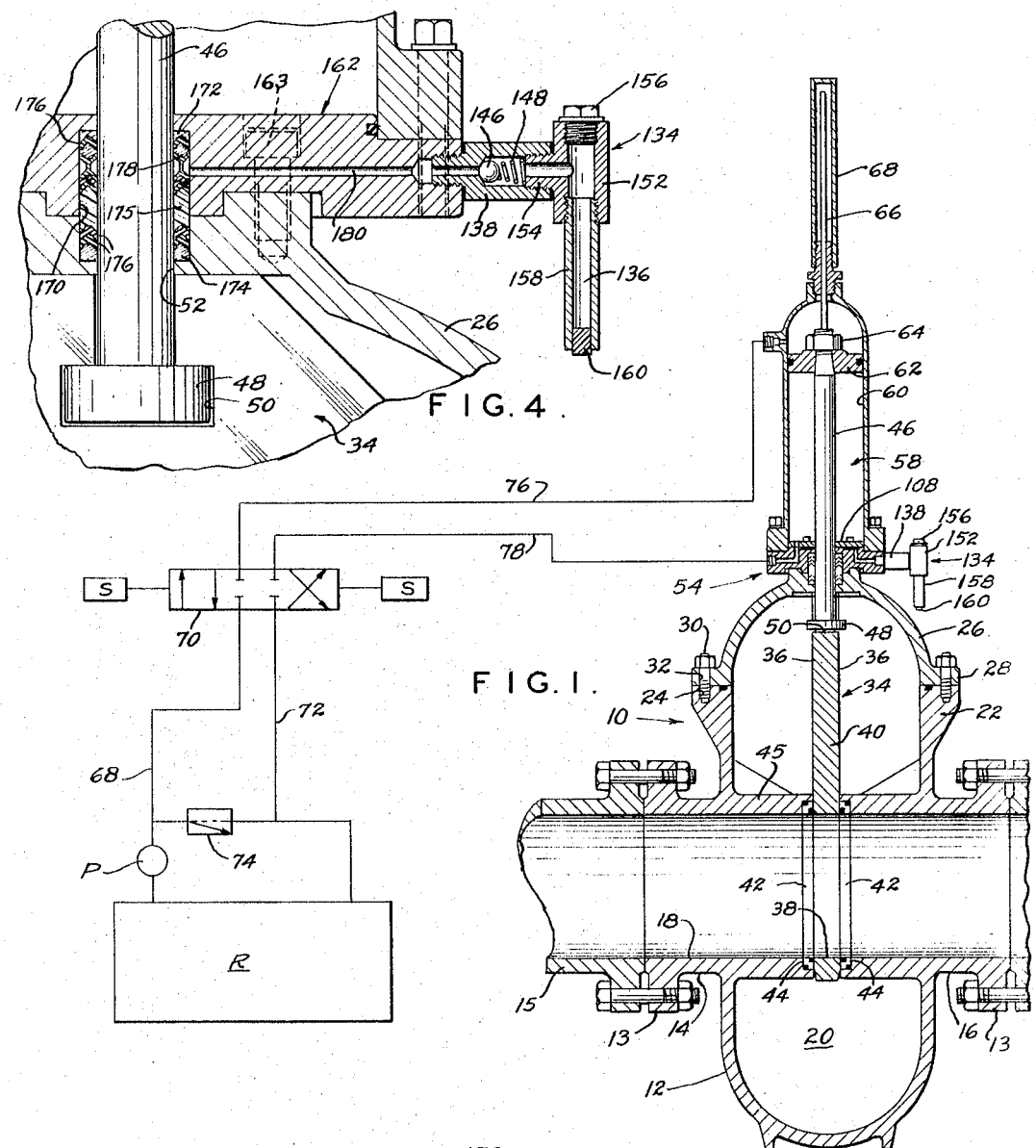
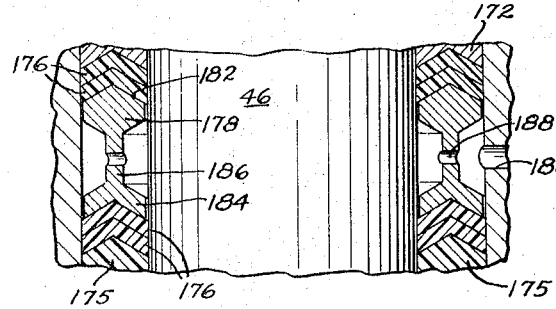
INVENTOR.
CLIFFORD E. ANDERSON
BY
AGENT

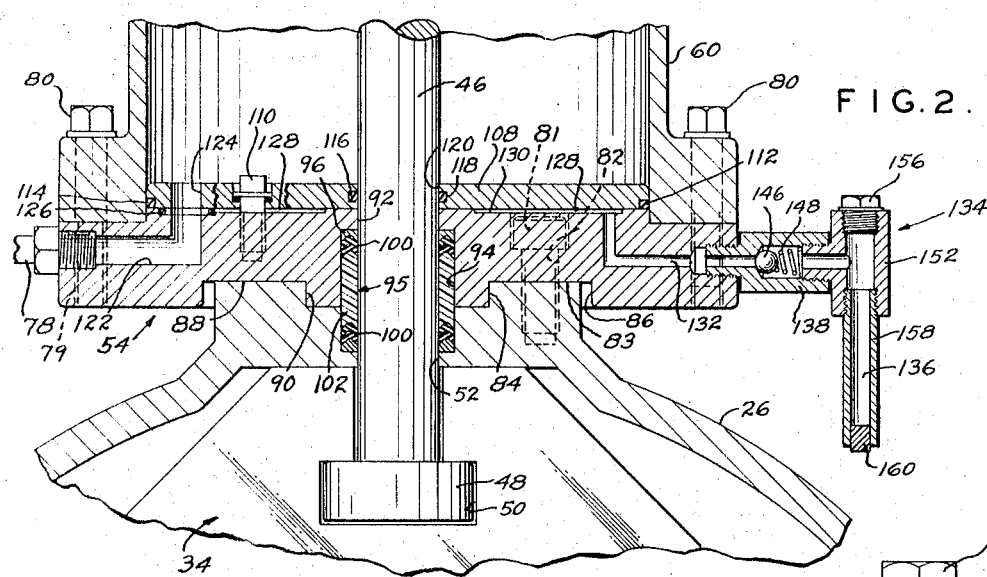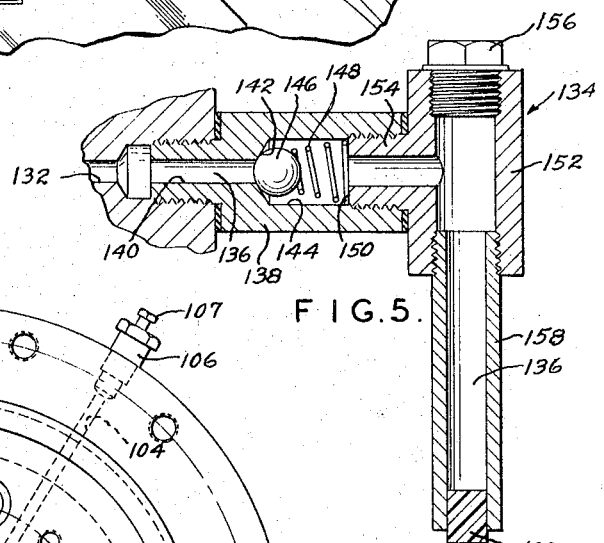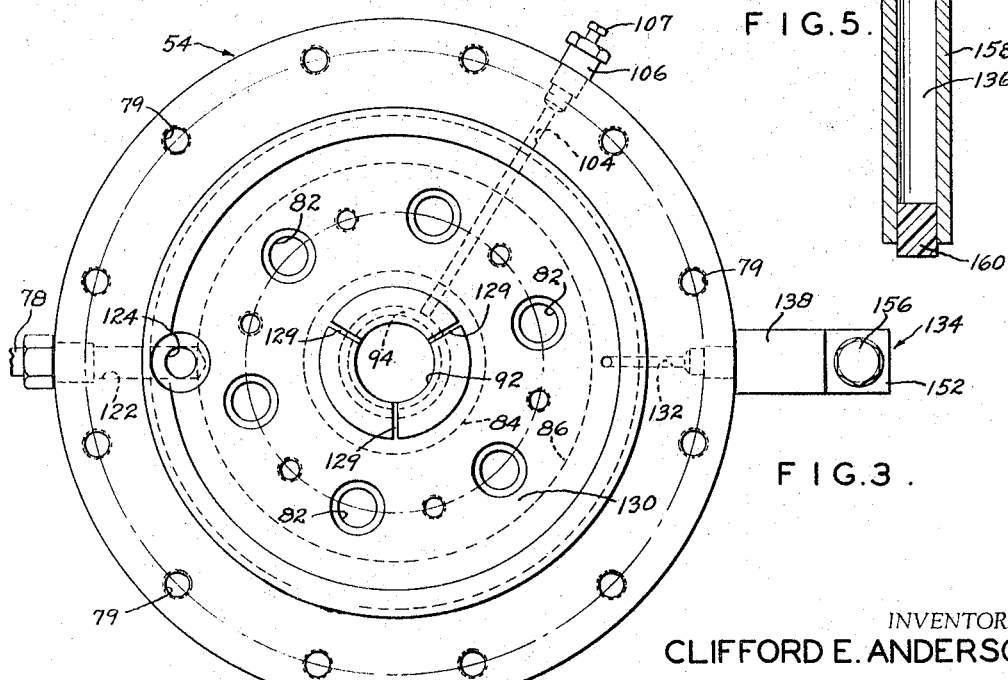

United States Patent Office 3,307,574
Patented Mar. 7, 1967

3,307,574
DRAIN STRUCTURE FOR VENTING LEAKED
FLUID FROM VALVE STEM PACKING
Clifford E. Anderson, Houston, Tex., assignor to ACF
Industries, Incorporated, New York, N.Y., a corporation of New Jersey
Filed Feb. 7, 1964, Ser. No. 343,402
8 Claims. (Cl. 137—312)

This invention relates to valves in general and particularly to a through conduit type gate valve employing a remotely controlled fluid motor for opening and closing a fluid passage formed in the valve.

The rapid development of high producing oil fields in countries which do not have seaport facilities or which do not have adequate seaport facilities, has led to the development of offshore loading facilities for loading and unloading tanker vessels. Some modern tanker vessels in use today are extremely long and have a draft approaching 75 feet, thus restricting their use in many seaports in the world. At times these extremely large tanker vessels are partially loaded in a seaport of restricted depth, then moved into the open sea at a position where the water depth is greater than the maximum draft of the vessel and the loading operation is then finished by transferring fluid from a smaller tanker vessel to the large tanker vessel.

One method of offshore loading of vessels is by loading from a floating platform. A pipeline or several pipelines, for transporting the fluid to be loaded, are laid from a storage position on land along the ocean floor to a position offshore where the water is at a favorable depth for the vessel. The pipelines then extend up to a floating platform supporting valves for controlling the flow of fluid through the line. Flexible hoses extend from the valves on the platform and are connected to the vessel to conduct fluid from the valves to the vessel. Pumps for forcing the fluid through the line or lines are located in a pumping facility on shore near the storage facility. After the connection between the vessel and the line is made, an operator opens the platform valves and signals for the pumps to start the loading operation. While this type of offshore loading facility is efficient in operation, it is quite expensive to maintain as well as being subject to storm damage and to damage from the vessel which is being loaded.

A second type of offshore loading includes a storage facility and pumping system located on shore. One or more pipelines are laid out from the pumping facility to a position of optimum water depth. A remotely controlled valve is connected to each of the pipelines and is located on the ocean floor. To each valve there is connected one end of a flexible hose of sufficient length for connection to the vessel on the surface. The hose lies on the ocean floor when not in use and its free end is attached to a marking buoy by a small cable or line. The vessel to be loaded or unloaded, after anchoring near the marking buoy, retrieves the buoy and hoists in the line or cable, which in turn raises the flexible hose from the ocean floor. After the hose has been cleaned, such as by washing off any mud accumulation or marine growth, etc., connection is made to the vessel. A control station located on shore and which may be located several miles from the valve to be controlled, is provided with hydraulic control apparatus for operating a fluid motor, generally called a "piston operator," on each of the valves to move the gate of the respective valve to an open or a closed position as desired. Hydraulic lines are laid along with each of the pipelines from the control station to the fluid motor on each valve and conduct hydraulic fluid to the fluid motor. After receiving a signal from the vessel that the connection has been made, such as by radio or by an audible or visual signal, the control station starts the pumps and remotely controls opening and closing of the offshore submerged valves as desired.

In an undersea valve of the type described above, it is obvious that servicing would involve serious consideration and expense. For such servicing problems as leakage of the valve seats the valve must be removed from the line, raised to the surface of the sea, repaired and then reinstalled into the line. When a major repair is made, obviously, in the interest of preventative maintenance, replacement of minor items such as stem packings, sealing rings, etc., would be made to prevent the costly and involved procedure of removing the valve and servicing it for a minor problem such as leakage due to packing wear, for example.

To obviate the need for costly servicing when minor wear such as slight leakage of fluid from either the valve packing or the hydraulic cylinder occurs, the invention provides structure for venting the leaked fluid into the sea or into the medium surrounding the valve, which prevents serious damage to the valve or hydraulic operator from occurring. When an operator is mounted on the bonnet of the valve, it is highly possible that the leaked fluid can cause serious damage to the system. Leaked lading from the valve could enter the operator and foul the hydraulic fluid and cause corrosion of the hydraulic operator or otherwise render the operator inoperative. Leaked hydraulic fluid from the hydraulic operator likewise could foul the lading or could otherwise cause damage to the valve. Leakage of fluid, whether it be hydraulic fluid or lading, can be detected in an undersea valve only by excessive amounts of hydraulic fluid present in the lading, by excessive loss of hydraulic fluid through the hydraulic system, or by fouling of the hydraulic system with lading from the valve which may react chemically with the hydraulic fluid or with the hydraulic cylinder parts and cause serious damage. Small amounts of hydraulic leakage or leakage of the lading in an undersea valve system very likely would not be detected until serious damage has been done, which would require extensive repair or replacement of the valve or of a hydraulic system, either of which would be costly and would likely involve high production losses.

If the valve is in its closed position and the stem packings are leaking lading under line pressure, it is possible for the pressurized lading to enter the lower portion of the piston operator cylinder and to force the piston upwardly, thus opening the valve. The valve could, therefore, become opened and substantial quantities of lading could be lost before this condition is discovered and repaired.

It is an object of this invention to provide a novel undersea valve and hydraulic operator system which will continue to function properly regardless of minor packing leakage.

It is a further object of this invention to provide a novel undersea valve and hydraulic operating system including a packing assembly adapted to prevent contamination of the lading by hydraulic fluid and to prevent contamination of the hydraulic fluid by the lading.

It is an even further object of this invention to provide a novel packing assembly for a hydraulically controlled valve which, if leakage should develop, vents the leaked fluid into the medium surrounding the valve.

A further object of this invention contemplates the provision of a novel packing assembly which is inexpensive in manufacture and reliable in use.

Other and further objects of the invention will be obvious upon an understanding of the illustrative embodiments about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIGURE 1 is an elevational view in section illustrating a hydraulic operated slab gate valve incorporating this invention and a schematic illustrating operation of the valve system.

FIGURE 2 is a partial elevational view of FIGURE 1 in section illustrating the invention in greater detail.

FIGURE 3 is a plan view illustrating the adapter plate of FIGURE 1 in detail.

FIGURE 4 is a partial elevational view in section of a modified form of the invention.

FIGURE 5 is an enlarged sectional view of the drain fitting of the valve of FIGURE 1.

FIGURE 6 is an enlarged sectional view of the packing assembly of the valve of FIGURE 4.

Briefly described, my invention comprises a hydraulically operated gate valve having means for venting leaked fluid either from the hydraulic cylinder or from the valve stem packing to the medium surrounding the valve, to obviate the need for replacing the valve immediately should such leakage develop.

Corresponding reference characters indicate corresponding parts throughout the several views of the drawings.

Referring now to the drawings for a better understanding of the invention, FIGURE 1 illustrates a through conduit type slab gate valve 10 of the type employed to control the flow of fluid in an offshore loading system.

The gate valve 10 comprises a valve body 12 having an inlet passage 14 and an outlet portion 16 formed integral therewith. An annular flange 13 is formed on the inlet and outlet portions of the valve 10 and adapt the valve to be bolted into a pipe system 15. Obviously the valve may be connected into a pipe system by welded or threaded connections, for example, or by any of numerous well-known connection structure without departing from the spirit or scope of this invention. A longitudinal bore 18 is formed in the inlet and outlet passages 14 and 16 to form a flow passage through the valve. A valve chamber 20 is formed by the valve body 12 and intersects the bore 18. The valve body 12 terminates upwardly in a circular head portion 22, having a bolt circle along which spaced threaded openings 24 are arranged.

A bonnet portion 26 having an annular flange 28 is attached to the head 22 by means of threaded studs 30 extending through openings 32 in the flange 28.

A gate member 34 formed with parallel sealing surfaces 36 and a flow passage 38 is positioned within the valve chamber 20 and intersects the flow passage 18. The gate member 34 is adapted to move from a position where the flow passage 38 is aligned with the bore 18 of the valve to a position where the bore 18 is blocked by a solid portion 40 of the gate member 34.

Annular valve seat members 42 are positioned in seat recesses 44 formed in the hub portions 45 on either side of the gate member 34 and sealingly engage the surfaces 36 of the gate member 34 to prevent leakage of the lading between the seat members 42 and the gate member 34.

For raising and lowering the gate member 34 a valve stem 46 has an enlarged collar portion 48 thereof fitted into a T-shaped opening 50 formed in the gate member 34. The valve stem 46 extends through a bore 52 formed in the bonnet member 26.

A fluid motor, illustrated generally at 58, comprising a cylinder 60 having a reciprocating piston 62 located therein, is fixed to the upper extremity of the bonnet member 26, and is adapted upon being remotely energized, to cause reciprocation of the gate member to either its closed or its open position. The piston 62 is fixed to the upper extremity of the stem 46 (FIGURE 1) by a nut 64 which is threaded onto the stem 46. For employment of the invention in land installations or in partially submerged water installations, an indicator rod 66 extends upwardly from the stem 46 and is protected from possible damage by a removable housing 68, which is threadedly connected to the upper portion of the cylinder 60. The position of the gate member 34 is indicated visually by the position of the indicator rod 66.

Referring now to the hydraulic system illustrated schematically in FIGURE 1, hydraulic fluid is supplied from a reservoir R through a line 68 under pressure supplied by a pump P to either the upper or lower end of the hydraulic cylinder 60, under control by a four-way control valve 70. A return line 72 transports fluid from the four-way valve 70 back to the reservoir R. A relief valve 74 is actuated at a predetermined fluid pressure to return fluid to the reservoir or through the return line 72 when a predetermined excessive fluid pressure is reached in the line 68. Hydraulic lines 76 and 78 extend from the four-way valve to the hydraulic cylinder and transport hydraulic fluid to the cylinder 60 to cause actuation of the fluid motor 58 to open or close the valve 34. A pair of solenoids S are arranged to control the movement of the valve 70 to direct the hydraulic fluid to the upper or lower portion of the cylinder 60, as desired. The valve 70 may also be manually or pilot controlled if desired.

Upon movement of the four-way control valve 70 to the right (FIGURE 1), fluid will flow from the pump P through the line 68, through the control valve 70, and through the line 76 to the upper portion of the hydraulic cylinder 60, causing the piston to be driven downwardly to close the valve 10. Hydraulic fluid located in the cylinder 60 and below the piston 62 will be forced outwardly of the cylinder through the line 78, through the four-way control valve 70 and through the return line 72 to the reservoir R. Upon movement of the control valve 70 of FIGURE 1 to the left, the flow of fluid is reversed. The hydraulic fluid will then flow through the line 68, through the four-way valve 70 and through the line 78 to the lower portion of the hydraulic cylinder 60, forcing the piston 62 in an upward direction to raise the gate member 34 to its open position. Fluid located above the hydraulic piston 62 flows through line 76 and through the four-way control valve 70 and through the return line 72 back to the reservoir R.

Referring now to FIGURE 2, an adapter plate or base plate 54 is formed with a series of spaced threaded openings 79 on the marginal periphery thereof for attachment of the cylinder 60 to the adapter plate 54 by means of bolts 80. The adapter plate 54 is also formed with a second annular series of spaced openings 82 for attachment of the adapter plate 54 to the upper extremity of the bonnet member 26 by means of bolts 81. The lower face of the adapter plate 54 is formed with an annular groove 83 forming an inner shoulder 84 and an outer shoulder 86. A raised annular portion 88 of the bonnet member 26 is formed with an inner shoulder 90 which abuts the inner shoulder 84 on the adapter plate 54, when the portion 88 is received within the annular recess, to prevent shifting of the adapter plate 54 on the bonnet 26.

A centrally located opening 92 is formed in the plate 54 and is aligned with the bore 52 in the bonnet 26 to permit passage of the valve stem 46 therethrough. An annular packing chamber 94, formed concentrically with the openings 52 and 92, is defined by enlarged bores in the bonnet 26 and in the adapter plate 54. Positioned within the annular chamber 94 is a stem packing assembly illustrated generally at 95 in FIGURE 2, which includes an upper packing adapter ring 96 and a lower packing adapter ring 98, between which are positioned upper and lower packing rings 100, known as V or Chevron packings. The Chevron packings 100, which may be composed of materials such as duck impregnated with rubber, for example, are placed within the chamber 94 and in abutment with the upper and lower adapter rings. The Chevron packings are pressure actuated into sealing engagement with the stem 46 and with the walls of the packing chamber 94 by semisolid sealing material 102. The sealing material 102, which may be composed of plastic, for example, is forced into the packing chamber 94 through a bore 104 in the plate 54 (FIGURE 3) under pressure supplied by a packing fitting 106, threadedly attached to the plate 54. The pressurized packing material 102 forces the upper and lower Chevron packing rings 100 into tight sealing engagement, respectively, with the upper and lower adapter ring causing the Chevron packing rings to spread and establish a seal between the stem 46 and the packing chamber wall.

As wear on the packing assembly 95 occurs due to reciprocal movement of the stem 46 through the packing chamber 94, the Chevron packing ring members tend to further spread or flatten out so that sealing engagement is continually maintained.

Under prolonged wear, however, when the limit of pressure actuation of the Chevron packing rings is reached and leakage of lading through the packing occurs, assuming that the valve is accessible, an operator, using a simple wrench, will turn the screw 107 on the packing fitting to repressurize the Chevron packing rings by forcing more of the packing material 102 into the chamber 94 between the Chevron packing rings. When adjusting the packing fitting will no longer stop the leakage due to excessive wear on the packing, it becomes necessary to dismantle the valve and replace the worn packing assembly 95.

Replacement of the packing assembly as well as adjustment of the packing fitting is a simple and inexpensive task when the valve is positioned on land, but even the simplest of replacement or adjustment tasks requires serious consideration and may well be impossible when the valve is located on the ocean floor. The valve may be so encased in a protective cover to prevent sea water corrosion, that repair or replacement of worn or defective parts, regardless of the simplicity of the repair job, is impossible. Repair of the valve is absolutely essential at times when the lading may be contaminated by leaking hydraulic fluid or when the hydraulic system might be damaged by the lading should leakage of the lading through the packing assembly occur.

Therefore, in accordance with this invention, to prevent leakage of the lading or of the hydraulic fluid from damaging the valve, a leakage drain mechanism is provided. As illustrated in FIGURE 2, a sealing plate 108 is positioned within the cylinder 60 and is fixed to the top portion of the plate 54 by bolts 110, thus forming the bottom wall of the cylinder 60. An annular sealing member 112 is positioned within an annular chamber defined by a reduced diameter surface 114 formed on the periphery of the sealing plate 108 to prevent flow of hydraulic fluid from the cylinder 60 past the periphery of the sealing plate 108. An inner annular sealing member 116 is positioned within an annular chamber defined by a groove 118 undercut into the annular wall of a centrally located bore 120, and engages the stem 46 to prevent leakage of material through the bore 120.

A reversible hydraulic fluid passage is formed within the adapter plate 54 by a bore 122 and by an opening 124 in the sealing plate 108 to transport hydraulic fluid from the control line 78 to the lower portion of the cylinder 60 below the piston 62. An annular sealing member 126 is positioned about the bore 122 and between the adapter plate 54 and the sealing plate 108 to prevent leakage of hydraulic fluid from the fluid passage 122 into an annular drain channel 128 defined by an annular depressed surface 130 formed concentrically about the opening 92 in the adapter plate 54. Radial interceptor grooves 129 (FIGURE 4) are formed in the plate 54, and serve to transport leaked fluid from the opening 92 to the drain channel 128 should leakage develop in the stem packing.

A bore 132 (FIGURES 2 and 3) is formed in the adapter plate and communicates with the drain channel 128 to transport fluid from the channel 128 through a drain fitting 134 to the atmosphere or to the medium surrounding the valve.

The drain fitting illustrated generally at 134 is threadedly attached to the adapter plate 54 and has a passage 136 formed therein in communication with the drain passage 132 formed in the adapter plate 54 for transporting fluid from the passage 132 to the medium surrounding the valve. The drain fitting 134 (FIGURE 5) is comprised of a generally rectangular portion 138 having one end thereof threaded into mating threads in the adapter plate 54, and having a bore 140 formed therein communicating with the bore 132 in the adapter plate 54 and defining a portion of the fluid passage 136. An annular valve seat 142 is formed by a tapered shoulder within an enlarged bore 144 in the cylindrical portion 138. A check valve 146 is normally seated against the valve seat 142 and is retained in position by a compression spring 148 positioned within the enlarged bore 144 and retained in position by an annular shoulder 150 formed on a T-fitting 152, which has an external threaded portion 154 thereof received within the cylindrical portion 138. A filler plug member 156 is threadedly engaged in the upper portion of the T-fitting 152 to close the same. An outlet tube 158 is threaded into the lower portion of the T-fitting 152 and has a corrosive resistant plug member 160, which may be formed of plastic, press-fitted within the lower end thereof to seal the lower portion of the tube 158 from the medium surrounding the valve.

When leakage occurs in either the packing assembly 95 or the operator seal 116 or both the stem packing and the stem seal, the leaked fluid will be conducted by the interceptor grooves 129 to the annular drain channel 128. The leaked fluid will then flow through the drain passage 132 in the adapter plate 54 and into the drain passage 136 in the drain fitting 134 unseating the check valve 146. Upon the build up of pressure to a predetermined level within the drain passage 136, the plastic plug member 160 will be blown from the outlet opening in the vertical tube 158 and the leaked fluid will flow out of the passage 136 and into the sea. Upon stopping of the leakage, such as will occur when a leaking fluid motor is unpressurized, or when flow through a valve with a leaking packing ceases, the check valve 146 will again be seated by the spring 148 against its valve seat 142 to prevent seawater from entering the passage 132. As will generally be the case, the lading controlled by the valves as well as the hydraulic fluid for operating the fluid motors will have a lower specific gravity than water. Therefore, upon stopping of leakage, the fluid trapped within the vertical tube 158 will form a liquid seal, preventing the seawater from entering the fixture 134 and the drain assembly will be protected from corrosive action by the seawater even after the plug member 160 has been forced from the tube 158.

As illustrated in FIGURE 4, a modified adapter plate illustrated generally at 162, having a lower portion of similar configuration as adapter plate 54 described above in regard to FIGURE 3, is formed to fit and be removably attached to the upper portion of the bonnet member 26 by a series of bolts 163. The lower portion of the hydraulic cylinder 60 is bolted to the plate 162 and the upper surface of the adapter plate forms the bottom wall of the cylinder 60. An annular sealing member 164 is fitted into a groove formed in a reduced diameter portion 168 of the adapter plate 162 and serves to establish a fluid-tight seal between the hydraulic cylinder 60 and the adapter plate 126.

An annular packing chamber 170 formed by enlarged bores formed in the bonnet member 26 and the plate 54 concentrically with the valve stem 46, retains a packing assembly surrounding the valve stem 46 to establish a fluid-tight seal between the bonnet 26 and the valve stem. An upper packing retainer ring 172 and a lower packing retainer member 174 are positioned respectively at the upper and lower extremities of the packing chamber 170. Chevron packings 176 are placed adjacent the upper and lower retainer rings and are adapted for pressure actuation by sealing material 175 forced into the packing chamber 170 between the Chevron packings by a packing fitting assembly similar to the fitting 106 in FIGURE 3.

Positioned in engagement with the upper Chevron packing rings is an annular relatively rigid leakage collection member 178 (FIGURES 4 and 6) which is adapted to collect leakage of hydraulic fluid from the hydraulic cylinder as well as lading leaked from the packing assembly and to transport the leaked fluid through a bore 180 formed in the adapter plate 162 and through a drain fitting 134 to the medium surrounding the valve as discussed above.

Referring now to FIGURE 6, the leakage collection member 178 is formed with an upper portion 182 having a shape mating with the lower surface of the upper Chevron packing members 176 and a lower portion 184 shaped to mate with the upper surface of the packing member 176 located immediately below the collection member 178. The upper and lower portions of the leakage collection member 178 are connected by an annular integral web portion 186 which is formed with a series of small apertures 188 to conduct fluid from the inner periphery of the leakage collection member to the outer periphery thereof. A plurality of Chevron packing members 176 are spaced from the leakage collection member 178 and are in engagement with the lower adapter member 174 to define an annular chamber for receiving semisolid packing material 175 under pressure supplied by a packing fitting such as that illustrated at 106 (FIGURE 3).

Operation: after the piston operator, including the drain fitting 134 (FIGURES 1 and 2), has been connected to the valve, and the valve 10 connected into a pipeline for which the control is desired, the plug 156 on the drain fitting 134 is removed and the interior of the drain fitting is filled with a preservative oil. After the plug 156 has been replaced and tightened to seal the filling opening of the fitting, the valve 10 and pipeline are lowered into the proper operative position on the ocean floor, and the flow control system is ready for operation. In the modification illustrated in FIGURES 1, 3 and 4, leakage of hydraulic fluid from the hydraulic cylinder 60 along the valve stem 46 and into the valve is normally prevented by the annular seal ring 116 and leakage of lading from the valve chamber 20 along the valve stem 46 and into the cylinder 60 is normally prevented by the stem packing assembly. As the seal ring 116 becomes so worn, due to reciprocation of the valve stem 46, that leakage of hydraulic fluid occurs, the leaked hydraulic fluid will flow through the interceptor channels 129 (FIGURE 4) and into the annular drain channel 128 and then will be transported to the drain fitting 134 by a drain passage 132 where it will be bled into the sea or into the medium surrounding the valve. If leakage should develop in the packing assembly, due to wear produced by the reciprocating stem 46 on the Chevron packings 100, lading which leaks past the packings will flow through the interceptor channels 129, into the annular drain channel 128 and will then be carried by drain passage 132 to the drain fitting 134 to be vented as described below. Leaked fluid whether it be lading or hydraulic fluid will, therefore, be vented into the medium surrounding the valve and will not damage the valve or the hydraulic valve operator system. The valve and valve operator system, even though they may be sufficiently worn that leakage occurs, need not be repaired or replaced until such time as major maintenance is required.

In regard to FIGURES 2 and 6, the modified embodiment illustrated does not include a sealing plate as illustrated in FIGURES 1 and 3, but rather the top surface of the adapter plate 162 forms the bottom wall of the hydraulic cylinder. Therefore, any leakage of hydraulic fluid from the hydraulic cylinder would flow into the valve stem packing assembly. However, if leaked hydraulic fluid flows past the upper Chevron packing rings of the stem packing assembly, it is collected by the leakage collection member 178 and flows through the openings 188 and through the bore 180 and is vented into the sea by the drain fittnig 134, as discussed above. Likewise, leakage of lading past the Chevron packing member adjacent the lower portion 184 of the leakage collection member 178, also flows through the openings 188 in the web portion 186 of the leakage collection member and through the drain bore 180 in the plate 162 where it is also vented into the sea through the drain fitting 134, thus preventing leaked fluid, whether from the valve or from the hydraulic system, from damaging either the valve or the hydraulic system and preventing contamination of the lading.

The plastic plug member 160 is lightly press-fitted within the outlet tube 158 of the drain fitting 134 so that a predetermined pressure, for example approximately 50 p.s.i. of pressure, will force the plug 160 from the tube 158. The purpose of the plug 160, therefore, is to seal the lower end of the outlet tube to prevent sea water corrosion of the inside parts of the drain fitting 134 and to prevent marine growth from blocking the outlet tube. When fluid at a pressure above the predetermined pressure, for example 50 p.s.i., is forced into the drain fitting 134, the check valve 146 will be unseated and the plug 160 will be blown from the outlet tube allowing the leaked fluid to flow from the drain fitting into the sea. If leakage of the fluid stops, for example, after the valve has been operated and the cylinder 60 is no longer pressurized, the check valve 146 will again be seated by the spring 148 against the seat 142 and will prevent seawater from entering the outlet tube 158. Since hydraulic fluid and most anticipated ladings, i.e. crude oil, have a lower specific gravity than the gravity of seawater, even though the plug 160 has been blown from the tube 158, the leaked hydraulic fluid or lading will remain trapped in the drain fitting 134 by seawater and will prevent seawater from entering the fitting 134 and causing corrosion of the drain fitting assembly. When leakage begins again, such as by pressurizing the hydraulic cylinder 60 to operate the gate 34, the check valve 146 will again become unseated and leaked fluid will again flow out of the drain fitting 134 into the sea.

While discussion of this invention has generally been directed to use below the surface of the sea, it should be obvious that the invention is quite useful for nonsubmerged applications where a remotely controlled valve may remain unattended for long periods of time or when ladings or hydraulic fluids are employed which might cause serious damage to the valve system if leakage occurs.

From the foregoing, it will be seen that this invention is one well adapted to attain all the objects hereinabove set forth, together with other advantages which are obvious and inherent from the description of the apparatus itself.

It will be understood that certain features and subcombinations are of utility and may be employed without reference to other features and subcombinations.

This is contemplated by and is within the scope of the claims. As many possible embodiments may be made of the invention without departing from the scope thereof, it is to be understood that all matters herein set forth or as shown in the accompanying drawings are to be interpreted as illustrative and not in a limiting sense.

I claim:

1. A valve for use in a corrosive environment, said valve comprising a valve body formed with a valve chamber therein, a valve member positioned for reciprocal movement within the valve chamber, a stem extending through said body for opening and closing said valve member, a stem operator having a base portion thereof fixed to said valve body, sealing means for normally preventing the flow of fluid between said valve body and said stem operator, drain means including a check valve for transporting fluid from said sealing means to the exterior of said valve upon failure of said sealing means, means for sealing said check valve from contact with said corrosive environment prior to failure of said sealing means.

2. A valve for use in a corrosive liquid of higher specific gravity than oil comprising a valve body formed with a valve chamber therein, a valve member positioned for reciprocal movement within the valve chamber, a stem extending through said body for opening and closing said valve member, a stem operator having a base portion thereof removably fixed to said valve body, stem sealing means forming a fluid-tight seal between the valve body and the stem, said stem sealing means normally preventing the flow of fluid between said valve body and said stem operator, drain means including a check valve provided by said base portion for transporting fluid from said sealing means to the exterior of said valve upon failure of said sealing means, means for sealing said check valve against fluid communication with said corrosive liquid prior to failure of said sealing means, means providing a liquid seal to prevent contact between said corrosive liquid and said check valve subsequent to failure of said sealing means.

3. A valve for use in a corrosive liquid environment of higher specific gravity than oil, said valve comprising a valve body formed with a valve chamber therein, a valve member positioned for movement within said valve chamber for opening and closing said valve, a stem extending through said valve body for moving said valve member, a stem operator having a base portion thereof fixed to said valve body, a stem packing in said base portion for normally preventing the flow of oil between said valve body and said stem operator, a drain bore formed in said base portion and communicating with said stem packing, a drain fixture fixed to said base portion and having a drain passage therein in communciation with said drain bore, check valve means in said drain passage for allowing the flow of fluid in only one direction upon faliure of said stem packing, said drain passage terminating in a vertically extending portion, said vertically extending portion having a displaceable closure at its extremity sealing said check valve means against fluid communication with said corrosive environment, oil leaked from said stem packing forming a liquid seal in said vertical passage to prevent contamination of said check valve means by said corrosive liquid.

4. A valve for use in water comprising a valve body formed with a valve chamber therein, a valve member positioned for reciprocal movement within said valve chamber for opening and closing said valve, a stem operator having a base portion thereof fixed to said valve body, a stem extending through said valve body, through said base portion and into said stem operator, first stem sealing member normally preventing the flow of oil from said stem operator to said valve chamber, a second stem sealing member normally preventing the flow of oil from the valve chamber to the stem operator, an oil leakage collection member positioned between said first and second stem sealing members for collecting leaked oil from either the first or second stem sealing members upon failure thereof, drain means including a check valve communicating with said leakage collection member for transporting leaked fluid oil to the exterior of the valve, said drain means including a drain passage terminating in a vertically extending portion, said vertically extending portion having a pressure displaceable sealing member closing its lower extremity to prevent water in which said valve is located from contacting said check valve prior to the development of leakage of oil past either of said stem sealing members, said leaked oil displacing said pressure displaceable sealing member and forming a liquid seal within said vertically extending portion of said drain passage preventing said water from contacting said check valve.

5. Drain structure for venting leaked oil from the stem packing and power operator packing of a valve for submerged use in water and having a power operator fixed thereto, said drain structure comprising a plate means for separating said power operator from said valve and for intercepting leaked fluid from either or both, said plate means including a chamber for said packing and a passage extending from said chamber to the exterior thereof for channeling the intercepted fluid, a drain fixture fixed to said plate means and having a conduit therein in communication with said passage, check valve means within said drain fixture conduit for allowing the flow of oil in only one direction, means sealing said drain fixture until said packings begin to leak, said leaked oil cooperating with said drain passage to form a liquid seal to prevent said water from contacting said check valve.

6. Drain structure for venting leaked fluid from the stem packing of a submerged valve having a power operator fixed thereto, said drain structure comprising a plate means for separating said power operator from said valve and for intercepting leaked fluid from either or both, said plate means including a chamber for said packing and a passage extending from said chamber to the exterior thereof for channeling the intercepted fluid, a drain fixture fixed to said plate means and having a conduit therein in communication with said passage, a check valve within said drain fixture conduit for allowing the flow of fluid in only one direction, a plug member sealing said drain fitting until said packings begin to leak, said plug member being forced from said drain fitting by the leaked fluid when leakage begins, means preventing the medium surrounding the valve from entering said drain fixture upon stopping of leakage from said packings.

7. Drain structure for venting leaked fluid from the stem packing and power operator packing of a submerged valve having a power operator fixed thereto, said drain structure comprising a plate means for separating said power operator from said valve and for intercepting leaked fluid from either or both, said plate means including a chamber for said packing and a passage extending from said chamber to the exterior thereof for channeling the intercepted fluid, a drain fixture fixed to said plate means and having a conduit therein in communication with said passage, a ball check valve within said drain fixture conduit for allowing the flow of fluid in only one direction, a portion of said drain fixture conduit being vertically disposed and having an outlet at the lower end thereof, sealing means closing said outlet until said packings begin to leak, said sealing means being forced from said outlet by the leaked fluid, means preventing the medium surrounding the valve from entering said fitting upon stopping of leakage from said packings.

8. Drain structure for venting leaked fluid from the stem packing and power operator packing of a valve submerged in water having a power operator fixed thereto, said drain structure comprising a plate means for separating said power operator from said valve and for intercepting leaked fluid from either or both, said plate means including a chamber for said packing and a passage extending from said chamber to the exterior thereof for channeling the intercepted fluid, a drain fixture fixed to said plate means and having a conduit therein in communication with said passage, a ball check valve within said drain fixture conduit for allowing the flow of fluid in only one direction, a portion of said drain fixture conduit being vertically disposed and having a drain outlet at the lower end thereof and a filling opening at the upper end thereof, a threaded plug closing said filling opening, a sealing plug being friction fitted within the drain outlet, the sealing plug adapted to be forced from the outlet opening by the leaked fluid, the vertically disposed portion of said drain fixture conduit establishing a liquid seal upon stopping of leakage from said packings to prevent water from entering the drain fixture.

References Cited by the Examiner
UNITED STATES PATENTS

| | | | |
|---|---|---|---|
| 1,068,193 | 7/1913 | Weil | 220—89 |
| 1,960,724 | 5/1934 | Bramsen | 277—59 XR |
| 2,738,945 | 3/1956 | Shafer | 251—31 XR |
| 3,054,617 | 9/1962 | Mueller | 277—2 |
| 3,226,078 | 12/1965 | Anderson | 251—62 |

FOREIGN PATENTS 940,679　10/1963　Great Britain.

WILLIAM F. O'DEA, *Primary Examiner.*

R. GERARD, *Assistant Examiner.*